(12) United States Patent
Huang et al.

(10) Patent No.: US 7,021,817 B2
(45) Date of Patent: Apr. 4, 2006

(54) MIXING ELEMENT WITH KEYWAY ATTACHMENT AND MIXER INCLUDING MIXING ELEMENT

(75) Inventors: Joseph C. Huang, Dayton, OH (US); Gongpu Yan, deceased, late of Troy, OH (US); by Lilian Chen, legal representative, Milpitas, CA (US)

(73) Assignee: Premark FEG L.L.C., Wilmington, DE (US)

( * ) Notice: Subject to any disclaimer, the term of this patent is extended or adjusted under 35 U.S.C. 154(b) by 266 days.

(21) Appl. No.: 10/405,900

(22) Filed: Apr. 2, 2003

(65) Prior Publication Data
US 2004/0194636 A1    Oct. 7, 2004

(51) Int. Cl.
*B01F 7/16* (2006.01)

(52) U.S. Cl. ........................................ 366/331; 403/349
(58) Field of Classification Search ................ 366/197, 366/203, 207, 288, 331; 403/349, 353; 99/348
See application file for complete search history.

(56) References Cited

U.S. PATENT DOCUMENTS

| 535,880 A | 3/1895 | Anderson |
| D33,822 S | 1/1901 | Colton |
| 682,292 A * | 9/1901 | Sukalle ........................ 366/331 |
| 904,935 A * | 11/1908 | Brown ........................ 366/331 |
| 1,127,836 A | 2/1915 | Whalen et al. |
| 1,167,336 A | 1/1916 | Clark |
| 1,175,530 A | 3/1916 | Kirchoff |
| 1,264,128 A | 4/1918 | Rataiczak et al. |
| 1,467,820 A | 9/1923 | Trust et al. |
| 1,783,437 A | 12/1930 | Laib |
| 1,792,363 A * | 2/1931 | Dehuff ........................ 403/348 |
| 1,820,677 A * | 8/1931 | Rataiczak ................... 403/349 |
| 1,872,004 A * | 8/1932 | Rataiczak et al. .......... 366/309 |
| 2,060,523 A * | 11/1936 | Packer ........................ 403/349 |
| 2,169,014 A | 8/1939 | Aalborg |
| 2,184,225 A * | 12/1939 | McDuffee et al. .......... 366/288 |
| 2,269,170 A | 1/1942 | Allenby |
| 2,329,640 A | 9/1943 | Moeller |
| 2,615,942 A | 10/1952 | Edman |
| 2,621,906 A | 12/1952 | Van Guilder |
| 2,630,303 A | 3/1953 | Krucker |
| 2,639,904 A | 5/1953 | McMaster et al. |
| 2,832,575 A | 4/1958 | Cirone |

(Continued)

FOREIGN PATENT DOCUMENTS

DE    1174954    7/1964

(Continued)

OTHER PUBLICATIONS

"General Purpose Couplings, Chrome-Plated Brass, 4" Flow, LC Series," catalog of CPC, pp. 22-23.

(Continued)

*Primary Examiner*—Charles E. Cooley
(74) *Attorney, Agent, or Firm*—Thompson Hine LLP (57) ABSTRACT

A mixing element for attachment to a mixer output shaft of a mixer and a mixer including the mixing element. The output shaft has transversely-extending first and second driving pins. The mixing element includes a collar portion having a keyway. The keyway has a shaft-receiving passageway and first and second pin-receiving pathways. The shaft-receiving passageway extends longitudinally downward from the keyway opening. The pin pathways each project outward from the shaft-receiving passageway and each include an entry portion and a torque-receiving portion spaced from the entry portion.

13 Claims, 5 Drawing Sheets

U.S. PATENT DOCUMENTS

| | | | |
|---|---|---|---|
| 2,833,576 A | 5/1958 | Cirone | |
| 3,423,781 A * | 1/1969 | Henson | 403/349 |
| 3,472,490 A | 10/1969 | Fitzhugh | |
| 3,724,765 A | 4/1973 | Rohrbaugh et al. | |
| 4,079,917 A | 3/1978 | Popeil | |
| 4,305,180 A * | 12/1981 | Schwartz | 403/349 |
| 4,337,000 A | 6/1982 | Lehmann | |
| D267,974 S | 2/1983 | Nilles et al. | |
| 4,436,125 A | 3/1984 | Blenkush | |
| 4,541,457 A | 9/1985 | Blenkush | |
| 4,739,885 A * | 4/1988 | Noland et al. | 403/349 |
| 4,760,984 A | 8/1988 | Hennessey | |
| 4,832,501 A | 5/1989 | McCauley | |
| 4,857,706 A | 8/1989 | Diamond | |
| 4,884,245 A * | 11/1989 | McIntosh et al. | 403/349 |
| D308,156 S | 5/1990 | van Asten | |
| 4,946,285 A | 8/1990 | Vennemeyer | |
| 4,974,965 A * | 12/1990 | Heinhold et al. | 366/331 |
| 5,052,725 A | 10/1991 | Meyer et al. | |
| D324,473 S | 3/1992 | Chen | |
| 5,104,158 A | 4/1992 | Meyer et al. | |
| 5,201,263 A | 4/1993 | Teng | |
| D336,591 S | 6/1993 | Leung | |
| 5,316,041 A | 5/1994 | Ramacier, Jr. et al. | |
| 5,366,286 A * | 11/1994 | Ruttimann | 366/331 |
| 5,464,300 A | 11/1995 | Crainich | |
| 5,494,074 A | 2/1996 | Ramacier, Jr. et al. | |
| 5,513,622 A * | 5/1996 | Musacchia, Sr. | 403/349 |
| 5,556,201 A | 9/1996 | Veltrop et al. | |
| 5,567,047 A | 10/1996 | Fritsch | |
| 5,655,692 A * | 8/1997 | Navin et al. | 403/348 |
| 5,741,084 A * | 4/1998 | Del Rio et al. | 403/349 |
| 5,758,963 A | 6/1998 | Xie et al. | |
| 5,791,777 A | 8/1998 | Mak | |
| 5,839,358 A | 11/1998 | Malecki | |
| 5,865,384 A | 2/1999 | Pai | |
| D410,194 S | 5/1999 | Hilton et al. | |
| 5,904,420 A * | 5/1999 | Dedoes | 403/349 |
| 5,911,403 A | 6/1999 | deCler et al. | |
| 5,915,482 A * | 6/1999 | Carruthers | 403/348 |
| 5,934,802 A | 8/1999 | Xie | |
| 5,938,244 A | 8/1999 | Meyer | |
| 5,975,489 A | 11/1999 | deCler et al. | |
| 6,024,124 A | 2/2000 | Braun et al. | |
| 6,082,401 A | 7/2000 | Braun et al. | |
| D460,676 S | 7/2002 | Lin | |
| 6,439,760 B1 | 8/2002 | Langeloh et al. | |
| 6,619,833 B1 | 9/2003 | Skudelny | |
| 6,652,137 B1 * | 11/2003 | Bosch et al. | 366/288 |
| D488,041 S | 4/2004 | Chen | |
| 6,866,413 B1 * | 3/2005 | Donthnier et al. | 366/331 |
| 6,908,222 B1 * | 6/2005 | Brunswick et al. | 366/331 |
| 2002/0181322 A1 | 12/2002 | Brunswick et al. | |
| 2004/0120218 A1 * | 6/2004 | Donthnier et al. | 366/331 |

FOREIGN PATENT DOCUMENTS

| | | |
|---|---|---|
| DE | 2802155 | 7/1979 |
| GB | 889462 | 2/1962 |
| GB | 2156894 A * | 10/1985 |

OTHER PUBLICATIONS

Istructions manual entitled "H600 & L800 Mixers," Hobart Corporation (Dec. 1999).

Service manual entitled "Models H-600 and H-600-T and L-800 Mixers," Hobart Corporation (Sep. 1977).

* cited by examiner

MIXING ELEMENT WITH KEYWAY ATTACHMENT AND MIXER INCLUDING MIXING ELEMENT

TECHNICAL FIELD

The present invention is directed to mixers, and more particularly to a mixing element with a keyway attachment and to a mixer including such a mixing element.

BACKGROUND

Mixers are used to mix and blend a variety of materials, such as food products and the like. Mixers typically include a removable mixing element that is attachable to a rotatable and/or orbitable output shaft of the mixer. Mixing elements come in various sizes and shapes and include agitators such as whips, dough hooks, beaters, etc. Such mixing elements are typically removably attached to the output shaft to enable the mixing elements to be removed or replaced for cleaning, repair, use of a different type of mixing element, etc.

A conventional mixer design includes a mixer having a mixer output shaft with a transversely-extending driving pin and having a mixing element with a keyway for attachingly receiving the output shaft. In this conventional design, the keyway includes a central passageway and a single slot projecting outwardly from the central passageway. The slot has a longitudinally-downward extending first portion connected to a circumferential extending second portion connected to a longitudinally-upward extending third portion. The mixing element is moved upward to insert the output shaft in the central passageway and the driving pin in the first portion of the slot, then is rotated to insert the driving pin in the second portion of the slot, and then is moved downward to insert the driving pin in the third portion of the slot. The third portion of the slot has a closed end (which is the torque-receiving portion of the slot in this conventional design) to longitudinally hold the mixing element in place. Typically, the radius of the driving pin is 0.28 inches, the output shaft has a diameter of 1.5 inches at the driving pin, and the longitudinal distance from the center of the driving pin to the lower end of the output shaft is 2.5 inches. Typically, the upper edge of the slot extends to a depth of at least 1.2 inches from the top of the mixing element when moving along the slot from the entry part of the slot to the torque-receiving portion of the slot.

What is needed is an improved mixing element and an improved mixer including such mixing element.

SUMMARY

In one aspect, a mixing element for use with a mixer having a mixer output shaft with transversely-extending first and second driving pins is provided. The mixing element includes a mixing-element body including a collar portion having a keyway for attachingly receiving a mixer output shaft therein. The keyway has a keyway opening having a longitudinal axis, a shaft-receiving passageway extending longitudinally downward from the keyway opening, and first and second pin-receiving pathways each projecting outward from the shaft-receiving passageway and each including an entry portion and a torque-receiving portion spaced from the entry portion.

In another aspect, a mixing element for use with a mixer having a mixer output shaft with transversely-extending first and second driving pins is provided. The mixing element includes a mixing-element body including a mixing portion and including a collar portion. The collar portion includes a keyway for attachingly receiving a mixer output shaft therein. The keyway has a keyway opening having a longitudinal axis, a shaft-receiving passageway extending longitudinally downward from the keyway opening, having a passageway diameter at the keyway opening, and having a lower end, and first and second pin-receiving pathways each projecting outward from the shaft-receiving passageway. Each pin-receiving pathway includes a first portion extending at least in part longitudinally downward from the keyway opening, and a second portion extending at least in part circumferentially from the first portion. The longitudinal distance between an intersection of the first and second portions and the lower end of the shaft-receiving passageway is at least 1.8 times the passageway diameter.

In a further aspect, a combination of a mixer output shaft and a mixing element connected thereto is provided. The mixer output shaft has transversely-extending first and second driving pins. The mixing element has a mixing-element body including a collar portion having a keyway attachingly receiving the mixer output shaft therein. The keyway has a keyway opening having a longitudinal axis, a shaft-receiving passageway extending longitudinally downward from the keyway opening, longitudinally receiving the mixer output shaft therein, and having a passageway diameter at the keyway opening, and first and second diametrically opposed pin-receiving pathways each projecting outward from the shaft-receiving passageway. Each pin-receiving pathway includes an entry portion and a torque-receiving portion spaced from the entry portion. Each torque-receiving portion has a corresponding one of the first and second driving pins engaged therein for transmitting torque from the mixer output shaft to the mixing element.

Having the mixer output shaft have two driving pins and having the keyway of the mixing element have two pin pathways provides a more robust and a more dynamically stable attachment of the mixing element to the mixer output shaft, especially when such pins (and pin pathways) are diametrically opposed to balance the dynamic motion of a rotating and/or orbiting mixing element as it encounters mixing areas of substantially different resistance and as it encounters overall mixing of significantly increasing and/or decreasing resistance.

DETAILED DESCRIPTION

Referring to FIGS. 1–7, an illustrated embodiment of the invention is for a mixing element 10 for a mixer 12 having a mixer output shaft 14 with transversely-extending first and second driving pins 16 and 18. The mixing element 10 comprises a mixing-element body 20 including a collar portion 22 having a keyway 24 for attachingly receiving the mixer output shaft 14 therein. The keyway 24 has a keyway opening 26, a central passageway 28, and first and second pin pathways (also called pin-receiving pathways) 30 and 32. The keyway opening 26 has a longitudinal axis 34. The central passageway 28 extends longitudinally downward from the keyway opening 26 for longitudinally receiving the mixer output shaft 14. The first and second pin pathways 30 and 32 each project outward from the central passageway 28 and each include a first portion 36 and a second portion 38. The first portion 36 extends longitudinally downward for longitudinally receiving a corresponding one of the first and second driving pins 16 and 18. The second portion 38 extends circumferentially from the first portion 36 for rotationally receiving the corresponding one of the first and second driving pins 16 and 18 previously received in the first portion 36. It is noted that "extending circumferentially" includes, without limitation, extending along a circumferential arc.

Figures 1, 2, 3:
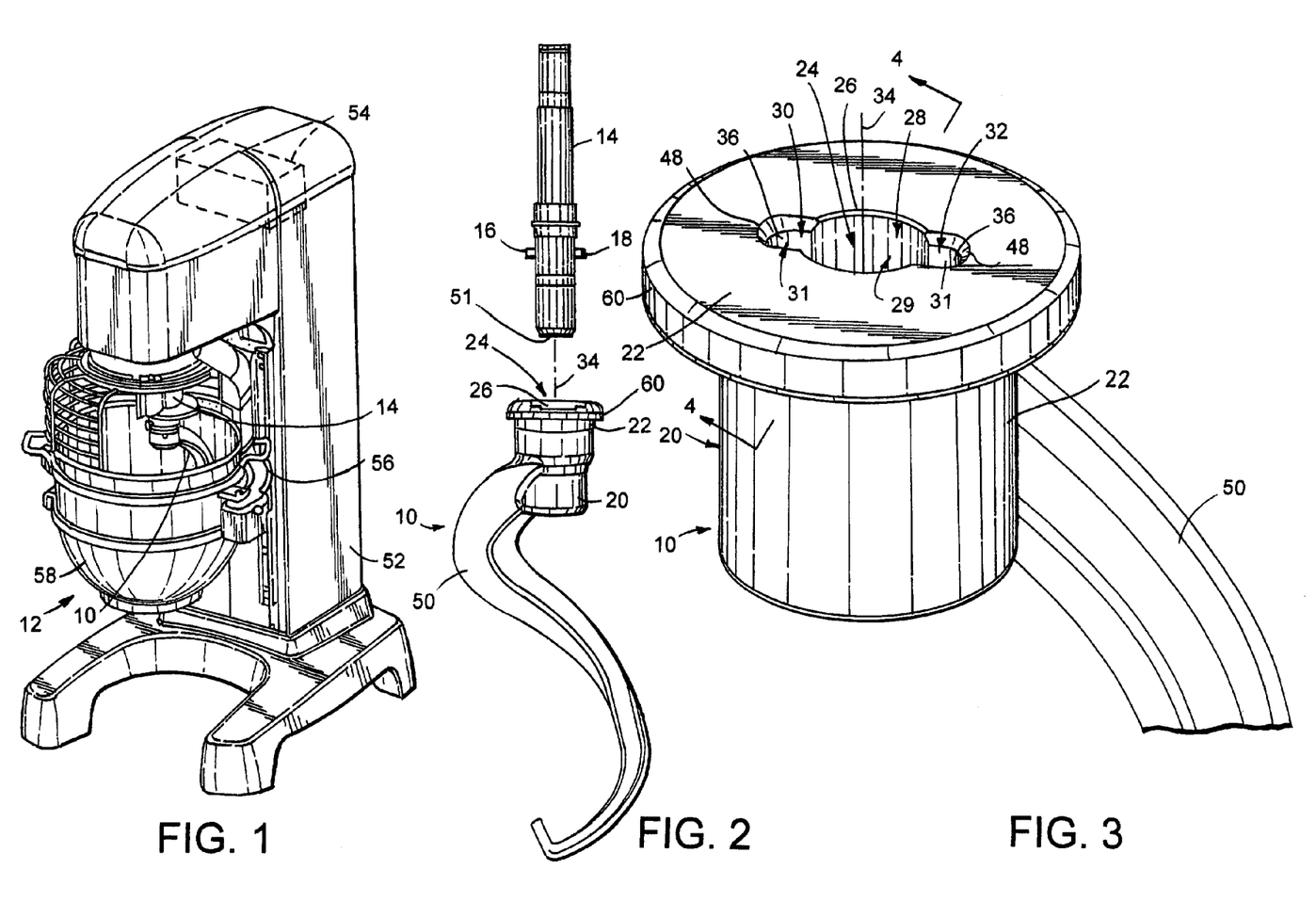
FIG. 1 is a front perspective view of an embodiment of a mixer, including a mixing element, of the invention.
FIG. 2 is an exploded perspective view of the mixer output shaft and the mixing element of the mixer of FIG. 1.
FIG. 3 is a detail upper perspective view of the collar portion of the mixing element of FIG. 2, and the upper part of the mixing portion of the mixing element of FIG. 2, showing the keyway including the central passageway and the first and second pin pathways.

In the illustrated embodiment of FIGS. 1–7, the first portion 36 of each of the first and second pin pathways 30 and 32 extends longitudinally downward from the keyway opening 26 as shown in FIG. 3. The diameter of the central passageway 28 may be substantially constant along its longitudinal length, or may have a lower part with a slightly smaller diameter than the upper part. In a still different embodiment, not shown, the upper part of central passageway may have a larger diameter for receiving the mixer output shaft and the first and second driving pins, the lower part of the central passageway has a smaller diameter for receiving only the mixer output shaft, and the first and second pin pathways extend outward from the lower part of the central passageway. In the illustrated embodiment, the first portion 36 of each of the first and second pin pathways 30 and 32 extends outward from the central passageway 28 to a point before the edge of the collar portion 22 as shown in FIG. 3. In a different embodiment, not shown, the first portion of the first and/or second pin pathways may extend completely to the edge of the collar portion creating a slit in the annular wall of the collar portion, although such extension beyond the protruding length of a corresponding driving pin would have no effect on the operation of the invention, as can be appreciated by those skilled in the art.

Referring again to the illustrated embodiment, the first and second pin pathways 30 and 32 each include a third portion 40 having a closed end 42 and extending longitudinally upward from the second portion 38 to the closed end 42 for longitudinally receiving the corresponding one of the first and second driving pins 16 and 18 previously received in the second portion 38. The central passageway 28 has a passageway diameter at the keyway opening 26 and has a lower end 44, and when the element is connected to the shaft 14, the longitudinal distance between the top edge of the closed end 42 of the third portion 40 and the lower end 44 of the shaft 14 is at least 2.2 times the passageway diameter. The lower end 44 may be an open lower end such that the central passageway 28 is a through bore of the collar portion 22 or the lower end may be a closed lower end of the central passageway.

Figure 6:
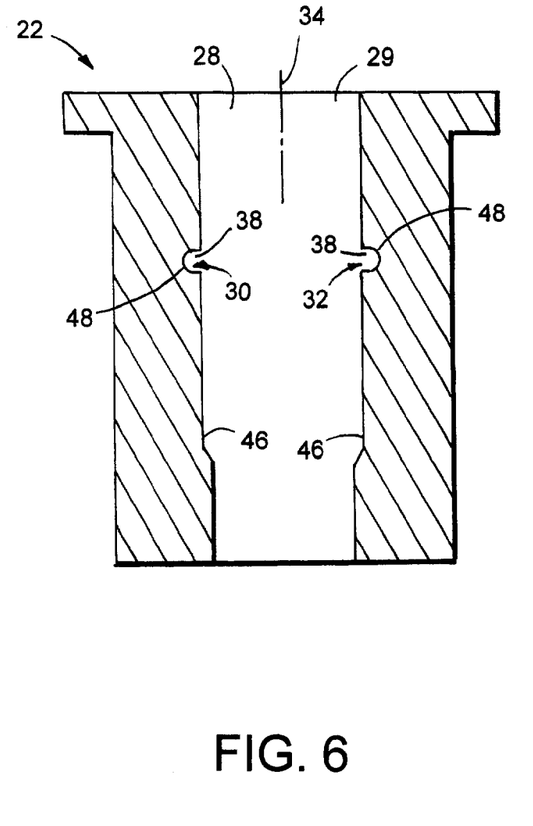
FIG. 6 is a sectional view of the collar portion of FIG. 5 taken along lines 6—6 in FIG. 5 showing the groove of the second portion of the first and second pin pathways.
Figure 7:
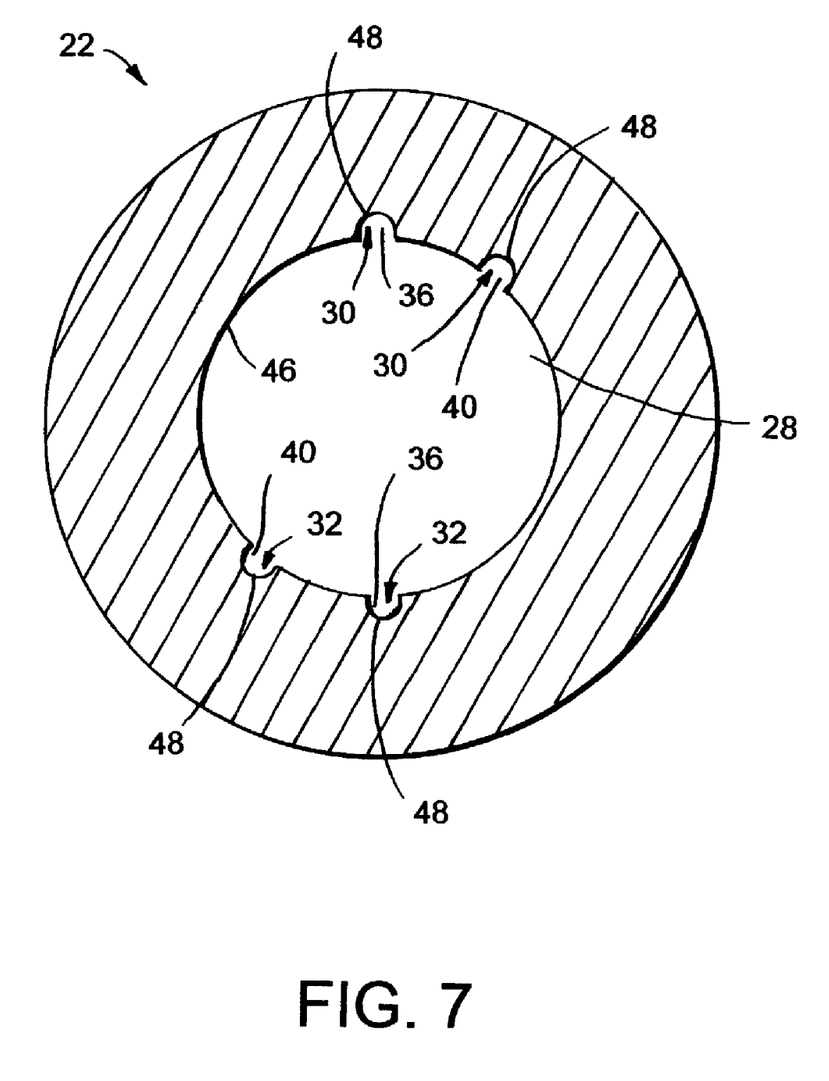
FIG. 7 is a sectional view of the collar portion of FIG. 4 taken along lines 7—7 in FIG. 4 showing the grooves of the first and third portions of the first and second pin pathways.

The first portion 36 of the first pin pathway 30 is disposed substantially diametrically opposite the first portion 36 of the second pin pathway 32 as seen in FIGS. 3 and 7. The first and second driving pins 16 and 18 may be first and second protruding ends of a rod (not shown) extending transversely through the output shaft 14. The second portion 38 of the first pin pathway 30 is disposed substantially the same distance from the keyway opening 26 as is the second portion 38 of the second pin pathway 32 as seen in FIG. 6. Similarly, the third portion 40 of the first pin pathway 30 is disposed substantially diametrically opposite the third portion 40 of the second pin pathway 32 as seen in FIG. 7.

Figure 5:
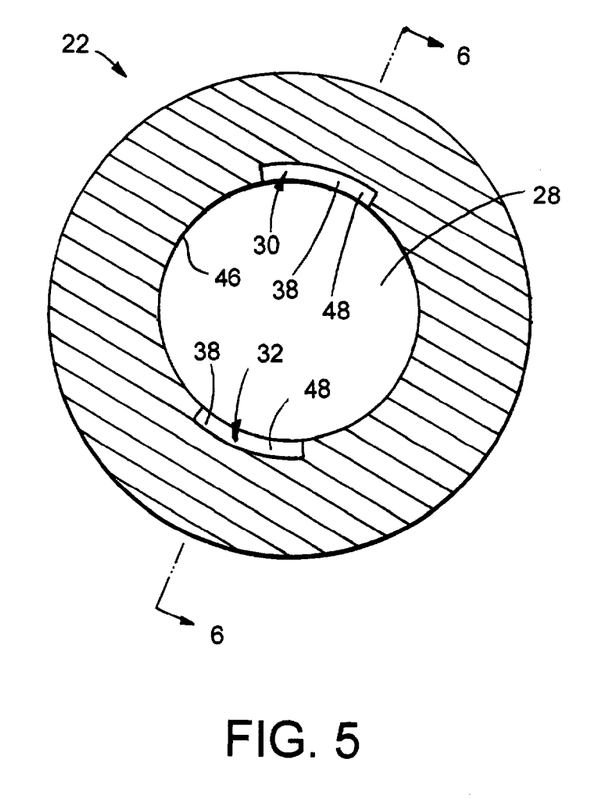
FIG. 5 is a sectional view of the collar portion of FIG. 4 taken along lines 5—5 in FIG. 4 showing the second portion of the first and second pin pathways.

In the illustrated embodiment, the collar portion 22 has an interior surface 46 surrounding the central passageway 28, and the first, second, and third portions 36, 38 and 40 of the first and second pin pathways 30 and 32 each are defined by grooves 48 on the interior surface 46 as shown in FIGS. 3, 6 and 7. The groove 48 of the second portion 38 of the first pin pathway 30 is spaced apart from the groove 48 of the second portion 38 of the second pin pathway 32 as shown in FIG. 5. In an alternative, not shown, the groove of the second portion of the first pin pathway and the groove of the second portion of the second pin pathway may be different portions of the same groove (such as, without limitation, a completely circumferential groove around the interior surface of the central passageway), as can be appreciated by the artisan.

In an alternative construction of the pin-passageway first portion, not shown, the first portion is a slit in the annular wall of the collar portion wherein the slit extends from the central passageway radially outward to the edge of the collar portion. In an alternative construction of the pin-passageway second portion, not shown, the second portion is defined by the space below a downward-facing and (partially or fully) circumferentially-extending ledge of the central passageway. In another alternative construction of the second portion, not shown, the second portion is defined by the space below the lower end 44 of the central passageway 28, such space being considered part of the keyway and included within the scope of the first and second pin pathways as described in the first paragraph of the "DETAILED DESCRIPTION" section of this patent application. When the third portion, not shown, is added to this latter construction, such third portion is considered part of the keyway and included within the scope of the third portion as described in the first sentence of the third paragraph of the "DETAILED DESCRIPTION" section of this patent application.

Examples of mixing portions 50 of the mixing-element body 20 of the mixing element 10 include, without limitation, whips, dough hooks, dough arms, beaters, pastry knives and scrapers. In one choice of materials, the mixing element 10 may consist essentially of stainless steel, but other materials are also possible.

In one construction the mixer output shaft 14 has a lower end 51, the mixer output shaft 14 at the driving pins 16 and 18 has a shaft diameter, and the distance from the top edge of the driving pins to the shaft lower end 51 is at least 2.2 times the shaft diameter. This provides a more robust and a more dynamically stable attachment of the mixing element 10 to the mixer output shaft 14. The output shaft 14 at the first driving pin 16 may have a shaft diameter of about 1.5 inches, the first driving pin 16 may have a diameter of about 0.56 inches, and the distance from the top of the first driving pin 16 to the lower end 51 of the output shaft 14 may be about 3.78 inches.

The mixer 12 has a mixer body 52 which houses a motor 54 therein. The motor 54 is operatively coupled to the rotatable and/or orbital mixer output shaft 14, as is known to the artisan. When the mixing element 10 is attached to the mixer output shaft 14, such rotation and/or orbital movement of the mixer output shaft 14 is transferred to the mixing element 10. The mixer body 52 includes a yoke 56 for receiving a bowl 58 thereon, such that when the bowl 58 is mounted on the yoke 56 and the mixing element 10 is received in the bowl 58, the contents of the bowl 58 can be mixed by the rotating and/or orbiting mixing element 10. The collar portion 22, of the mixing element 10 may include a flange 60.

In the illustrated embodiment, the mixer output shaft 14, apart from the first and second driving pins 16 and 18, has a substantially circular cross section, and the central passageway 28, apart from the first and second pin pathways 30 and 32, likewise is a substantially circular passageway to closely receive the mixer output shaft 14. Other shapes, not shown, for the output shafts and corresponding shapes for the central passageway and particular shapes of the driving pins and corresponding shapes of the pin pathways (such as curved or rectangular shaped grooves) for receiving the driving pins, are left to the artisan.

To attach the mixing element 10 to the mixer output shaft 14 of the mixer 12, the mixer output shaft 14 is stationary and aligned vertically with its lower end 51 pointing downward. The mixing element 10 is coaxially aligned with the mixer output shaft 14 (as in FIG. 2) and then is moved upward beneath the mixer output shaft 14 so that the lower end 51 of the mixer output shaft 14 is received in the keyway opening 26 of the keyway 24 of the collar portion 22 of the mixing-element body 20 and so that the first driving pin 16 is received in the first portion 36 of the first pin pathway 30 of the keyway 24 and the second driving pin 18 is received in the first portion 36 of the second pin pathway 32 of the keyway 24. The mixing element 10 is then moved upward as far as it will go with the first driving pin 16 being positioned at location 62 in FIG. 4. Next, while still raised, the mixing element 10 is rotated (counterclockwise looking downward in FIG. 4) as far as it will go with the first driving pin 16 being positioned at location 64 in FIG. 4. Then, the mixing element 10 is lowered until the driving pins are supported by the closed end of the third portion of the pin pathways with the first driving pin 16 being positioned at location 66 in FIG. 4. While attached, the first and second driving pins 16 and 18 transfer the rotation and/or orbiting motion of the mixer output shaft 14 to the mixing element 10. To detach the mixing element 10 from the mixer output shaft 14, the above steps are performed in reverse order (i.e., first lift the mixing element 10, then rotate the mixing element 10 clockwise looking downward in FIG. 4, and then lower the mixing element 10 to separate it from the mixer output shaft 14).

Figure 4:
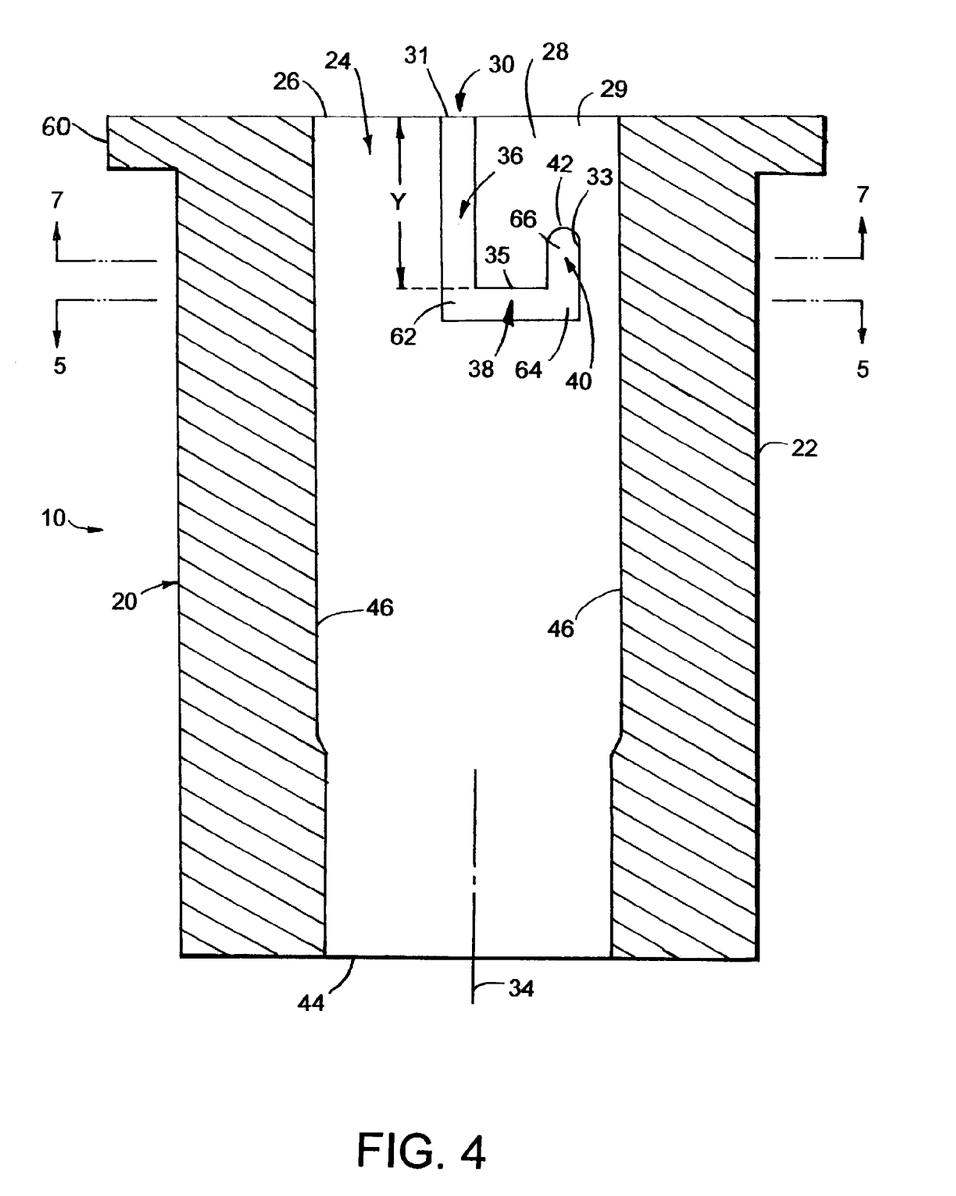
FIG. 4 is a cross-sectional view of the collar portion of FIG. 3 taken along lines 4—4 in FIG. 3 showing a portion of the interior surface of the collar portion including the complete first pin pathway.

The first and second pin-receiving pathways 30 and 32 each include an entry portion 31 that initially receives the driving pins 16 and 18 and a torque-receiving portion 33 spaced from the entry portion 31. During mixing operations the driving pins 16 and 18 engage the torque receiving pathway portions 33 to transmit torque to the mixing element. As best seen in FIG. 4, the torque receiving portion 33 of the illustrated embodiment is spaced both longitudinally and circumferentially from the entry portion 31, but variations are possible. In one embodiment, an upper edge 35 of each pin pathway is configured such that a highest part of a pin moving therealong will not exceed a depth Y of about 1.0 inches from a top of the collar portion when the pin is traveling along the region of the pathway from the entry part 31 to the torque-receiving portion 33. Maintaining this depth at or below 1.0 inches facilitates ease of attachment. Where a diameter of the shaft-receiving passageway at the keyway opening and/or at the torque-receiving portions 33 is about 1.5 inches, this configuration results in a depth of the upper edge 35 of each of the pin pathways being no more than ⅔ the diameter of the passageway at the keyway opening and/or at the torque-receiving portions.

Having the mixer output shaft have two driving pins and having the keyway of the mixing element have two pin pathways and two corresponding torque receiving pathway portions provides a more robust and a more dynamically stable attachment of the mixing element to the mixer output shaft, especially when such pins (and pin pathways) are diametrically opposed to balance the dynamic motion of a rotating and/or orbiting mixing element as it encounters mixing areas of substantially different resistance and as it encounters overall mixing of significantly increasing and/or decreasing resistance. Having the longitudinal distance between the torque receiving portion of the first and second pin pathways and the lower end of the mixing shaft be at least 1.8 times the passageway diameter at the keyway opening also provides a more robust and a more dynamically stable attachment of the mixing element to the mixer output shaft.

Figure 8A:
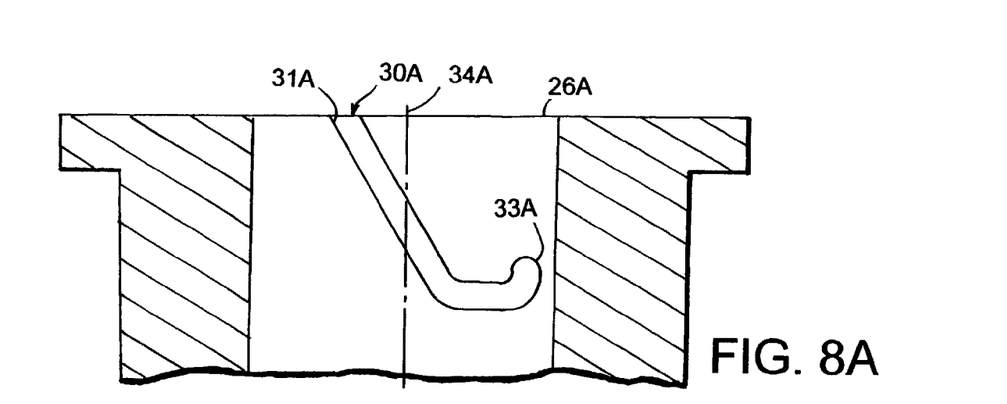
FIG. 8A–8C illustrate alternative pin-receiving pathway embodiments.
Figure 8B:
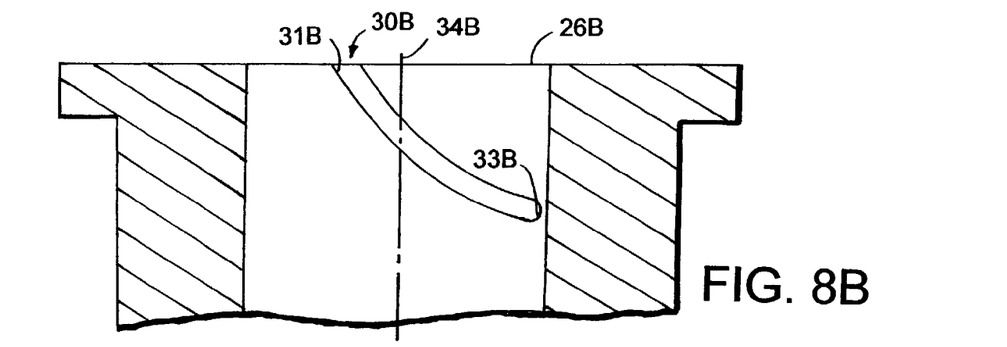
Figure 8C:
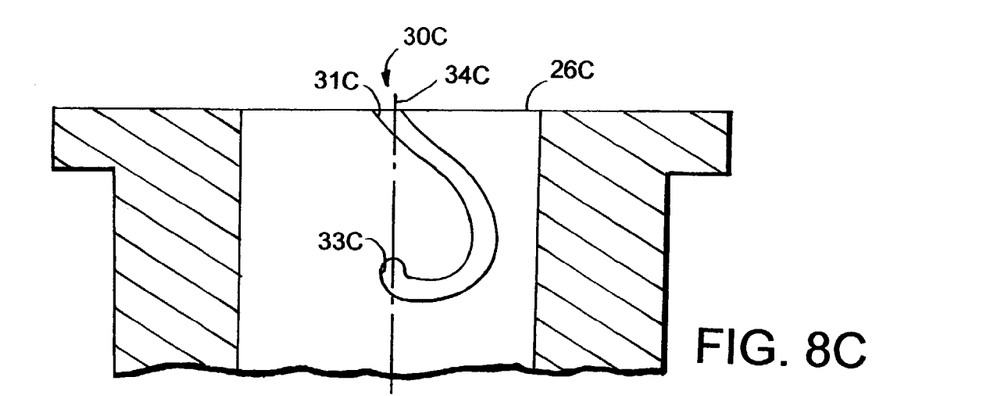

The foregoing description of several expressions of an embodiment of the invention has been presented for purposes of illustration. It is not intended to be exhaustive or to limit the invention to the precise form disclosed, and obviously many modifications and variations are possible in light of the above teaching. For example, while in the illustrated embodiment each pin-receiving pathway a substantially straight downward and longitudinally extending portion 36 that intersects with a circumferentially extending portion 38 and then to an upwardly extending portion 40, variations are possible as reflected in FIGS. 8A, 8B and 8C. FIG. 8A shows a pathway 30A arrangement in which the torque receiving portion 33A is spaced both longitudinally and circumferentially from the entry portion 31A, and the portion of the pathway that extends from the entry portion 31A downward extends at an angle to the axis 34A of the keyway opening 26A. FIG. 8B shows a pathway 30B arrangement in which the torque receiving portion 33B is spaced both longitudinally and circumferentially from the entry portion 31B, and the portion of the pathway that extends from the entry portion 31B is curved. The axis 34B of the keyway opening 26B is also shown. FIG. 8C shows a pathway 30C arrangement in which the torque receiving portion 33C is spaced longitudinally, but not circumferentially from the entry portion 31C, and the portion of the pathway that extends from the entry portion 31A downward to the torque receiving portion 33C follows a curved path. The axis 34C of the keyway opening 26C is also shown.

The invention claimed is:

1. A mixing element for use with a mixer having a mixer output shaft with transversely-extending first and second driving pins, wherein the mixing element comprises:
   a mixing-element body including a collar portion having
      a keyway for attachingly receiving a mixer output shaft therein and a mixing portion extending downward from the collar portion, wherein the keyway has;
      a) keyway opening having a longitudinal axis, b) a shaft-receiving passageway extending longitudinally downward from the keyway opening, and c) first and second pin-receiving pathways surrounded by the mixing-element body, each of the first and second pin-receiving pathways projecting outward from the shaft-receiving passageway and each including an entry portion and a torque-receiving portion spaced from the entry portion, wherein an upper edge of each pin-receiving pathway along a region of each pin-receiving pathway extending from its entry pad to its torque-receiving portion does not exceed a depth of 1.0 inches from a top of the collar portion.

2. The mixing element of claim 1, wherein the shaft-receiving passageway has a passageway diameter at the keyway opening, and wherein a longitudinal depth from a top collar portion to the upper edge of each pin-receiving pathway along the region of each pin-receiving pathway is no more than ⅔ the passageway diameter.

3. The mixing element of claim 1, wherein the shaft-receiving passageway has a passageway diameter at the torque receiving portions of the pathways, and wherein a longitudinal depth from a top collar portion to the upper edge of each pin-receiving pathway along the region of each pin-receiving pathway is no more than ⅔ the passageway diameter.

4. The mixing element of claim 1, wherein the torque-receiving portion of the first pin-receiving pathway is spaced diametrically opposite the torque-receiving portion of the second pin-receiving pathway.

5. The mixing element of claim 4 wherein the torque receiving portion of each pin-receiving pathway is spaced both longitudinally and circumferentially from its entry portion.

6. The mixing element of claim 1, wherein the second pin-receiving pathway is substantially identical to the first pin-receiving pathway as seen looking radially outward from inside the shaft-receiving passageway.

7. The mixing element of claim 1, wherein the collar portion has an interior surface surrounding the shaft-receiving passageway, and wherein the entry portion and the torque receiving portion of each pathway are formed by grooves in the interior surface.

8. A combination of a mixer output shaft and a mixing element connected thereto, wherein the mixer output shaft has transversely-extending first and second driving pins, wherein the mixing element has a mixing-element body including a collar portion having a keyway attachingly receiving the mixer output shaft therein, and wherein the keyway has:

a) a keyway opening having a longitudinal axis, b) a shaft-receiving passageway extending longitudinally downward from the keyway opening, longitudinally receiving the mixer output shaft therein, and c) first and second diametrically opposed pin-receiving pathways surrounded by the mixing-element body, each of the first and second pin-receiving pathways projecting outward from the shaft-receiving passageway and each including an entry portion and a torque-receiving portion spaced from the entry portion, each torque-receiving portion having a corresponding one of the first and second driving pins engaged therein for transmitting torque from the mixer output shaft to the mixing element.

9. The combination of claim 8, wherein the longitudinal distance between a top edge of the torque-receiving portion of each pin-receiving pathway and a lower end of the output shaft is at least 2.2 times a passageway diameter at the keyway opening.

10. The combination of claim 9, wherein the longitudinal distance between a top edge of the torque-receiving portion of each pin-receiving pathway and a lower end of the output shaft is at least 2.2 times a passageway diameter at the torque-receiving portions.

11. The combination of claim 8, wherein a longitudinal distance from a top edge of the torque-receiving portion of each pin-receiving pathway to a lower end of the output shaft is at least 3.50 inches.

12. The combination of claim 8 wherein the torque receiving portion of each pin-receiving pathway is spaced both longitudinally and circumferentially from its entry portion.

13. The combination of claim 8 wherein each pin-receiving pathway is configured such that an upper edge thereof does not exceed a depth of 1.0 inches from a top of the collar portion in a region extending from the entry part to the torque-receiving portion.

* * * * *

UNITED STATES PATENT AND TRADEMARK OFFICE
CERTIFICATE OF CORRECTION

| | |
|---|---|
| PATENT NO. | : 7,021,817 B2 |
| APPLICATION NO. | : 10/405900 |
| DATED | : April 4, 2006 |
| INVENTOR(S) | : Joseph C. Huang et al. |

It is certified that error appears in the above-identified patent and that said Letters Patent is hereby corrected as shown below:

Column 6

Line 66 - Change ";" at the end of the line to -- : --.
Line 67 - After "a)" insert -- a --.

Column 7

Line 11 - Change "pad" to -- part --.

Signed and Sealed this

Eleventh Day of July, 2006

JON W. DUDAS
*Director of the United States Patent and Trademark Office*